Nov. 4, 1924.
S. H. HIGGINBOTHAM ET AL
1,513,990
COLLAPSIBLE LANDING NET
Filed Oct. 22, 1923

INVENTORS
Samuel H. Higginbotham
Henry G. Godley
BY Nestall and Wallace
ATTORNEYS Patented Nov. 4, 1924.

1,513,990

UNITED STATES PATENT OFFICE.

SAMUEL H. HIGGINBOTHAM AND HENRY G. GODLEY, OF ALHAMBRA, CALIFORNIA, ASSIGNORS TO RADIUM APPLIANCE COMPANY, OF LOS ANGELES, CALIFORNIA, A CORPORATION OF CALIFORNIA.

COLLAPSIBLE LANDING NET.

Application filed October 22, 1923. Serial No. 669,957.

*To all whom it may concern:*

Be it known that we, SAMUEL H. HIGGINBOTHAM and HENRY G. GODLEY, citizens of the United States, and residents of Alhambra, in the county of Los Angeles and State of California, have invented new and useful Improvements in a Collapsible Landing Net, of which the following is a specification.

This invention relates to fishing tackle and especially to nets such as are used for landing fish, although it may be used for other purposes. The primary object of this invention is to provide a landing net consisting of a handle, a frame or hoop and net, and which, may for convenience of carriage and transport, be collapsed into a small space without necessitating the disassembling of the parts from their operative relation. A more specific object of this invention is to provide a landing net wherein the hoop and net fold within the handle. In addition to the broader objects of this invention it is in an object thereof to provide a structure which is strong, durable, easy to manipulate and wherein the position of the parts when open will be maintained.

Figure 1:
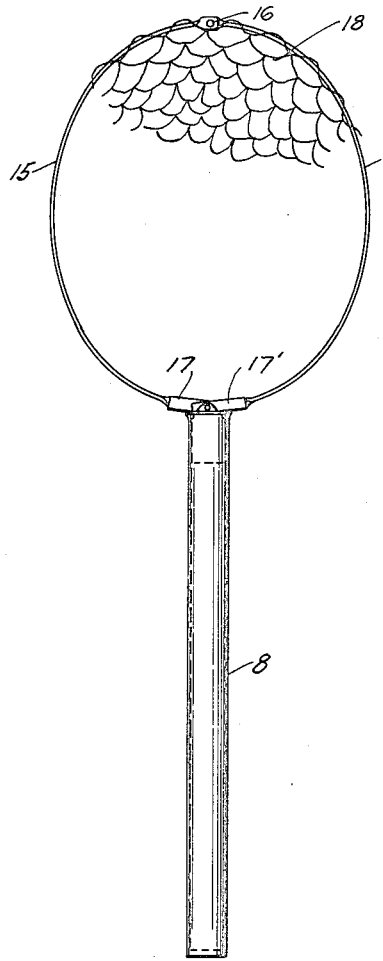
Figure 2:
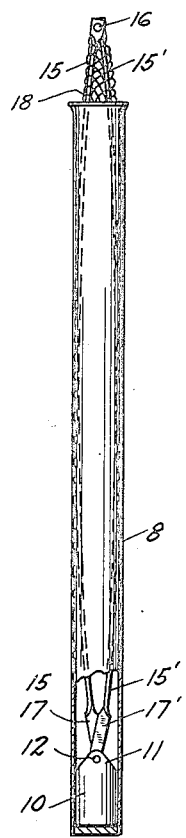
Figure 3:
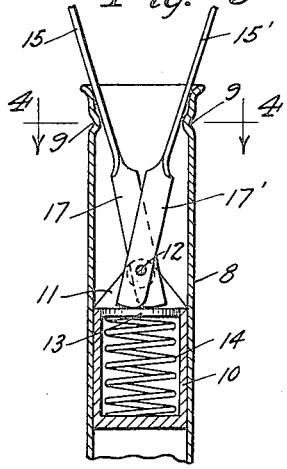
Figure 4:
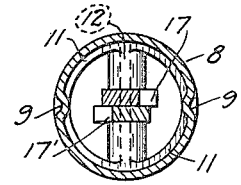
Figure 5:
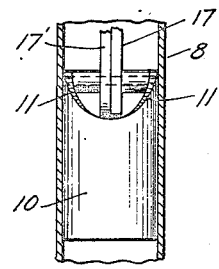
Figure 6:
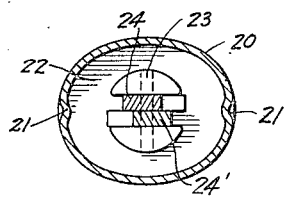
Figure 7:
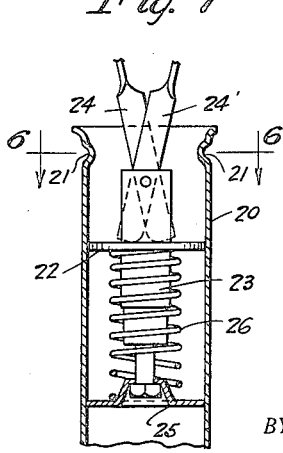

These objects together with other objects and corresponding accomplishments are obtained by means of the embodiment of our invention illustrated in the accompanying drawing, wherein:

Fig. 1 is a plan view of a preferred form of our invention showing the net in open position; Fig. 2 shows the net and frame of Fig. 1 folded within the handle; Fig. 3 is an axial section of a fragment of the structure shown in Figs. 1 and 2, the handle, shank block, and the hoop being shown; Fig. 4 is a section as seen on the line 4—4 of Fig. 3; Fig. 5 is an axial section through the handle showing the shank from another position; Fig. 6 is a transverse section through a modified form of the structure, wherein the handle is elliptical in cross-section; and Fig. 7 is a view of the form shown in Fig. 6 taken in axial section through the handle.

Referring more particularly to Figs. 1 to 5, inclusive, a hollow cylindrical handle is indicated by 8. The lower end of the handle may be closed by a plug or any other suitable means. The top of the handle is open and preferably belled outwardly. Nibs 9 are indented at diametrically opposite points and serve as stops whose function is later described.

The interior of the handle is smooth and slidably mounted therein is a shank block 10. The lower end of the block is closed and the upper edge is cut to form ears 11. The contour of the upper edge of the block is such as to form a cam surface with pockets for a purpose later described. Mounted between the ears is a pivot pin 12 on which the ends of the hoop are mounted. Slidably mounted within the bore of the shank block is a washer 13, and interposed between the washer and the bottom of the box is a spiral compression spring 14 tending to force the washer upwardly.

Mounted upon the pin 12 are the ends of the hoop. The hoop may consist of two pieces of strap spring metal indicated by 15 and 15'. These are turned at the outer ends, overlapped and fastened by a pivot pin as indicated by 16. The straps are preferably slightly bowed so that they will tend to open into hoop form. The other ends of the strap are turned at right angles to form similar fingers 17 and 17'. The outer lower corners of the fingers are bevelled and intended to rest upon the washer 13. The fingers are bored slightly off centers from their axes to receive point pin 12. A net 18 of suitable material is fastened to the hoop.

If the straps 15 and 15' of the hoop are pressed together so as to flatten the latter as shown in Fig. 2, the hoop and net may be pushed into the handle. As the strap flattens, the fingers press the washer 13 downwardly against the action of the spring 14 compressing the latter. Due to the off center position of the pivot pin with respect to the fingers, the latter do not take a position on dead center nor do they move over center which would be detrimental in attempting to open the net. In opening the net, the hoop is grasped at the end and the net pulled outwardly. This brings the shank block to the end of the handle, and if the nibs 9 are not in position to ride into the low part of the upper surface of the block, they will engage some point on the surface and due to the inclination of the surface turn the shank and the net so as to cause the nibs to ride into the low part and maintain their position as the box reaches its outermost position. The stops also act to prevent withdrawal of the frame. The pressure of the straps 15 and 15' outwardly against the bell end of the handle tending to spread the hoop will tend to draw the shank upwardly. Pressure of the washer 13 against the fingers of the hoop tends to spread the straps and also pull the block to the outer end. Thus, the tension of the hoop and the spring 14 tend to keep the shank back at the outer end of the handle and maintain the hoop in open position. The nibs 9 being positioned in the pockets maintain the hoop against turning in the handle.

In Figs. 6 and 7 a modified form of construction is shown. A handle 20 which is elliptical in cross section is provided. Slidably mounted within the handle is a shank block carrying the hoop. To limit the outer movement of the shank block, the handle is provided with nibs 21. The outer end of the handle may also be belled.

The shank block comprises a washer 22 which is elliptical in form and is slidably mounted upon a stem 23. The upper end of the stem is bifurcated to receive fingers 24 and 24' of the hoop. The construction of these fingers is the same as in the preferred form heretofore described. The fingers are pivotally secured in the stem by means of a pin and the lower ends of the fingers are abutted by the washer 22. Secured to the bottom of the stem is a disk member 25 conforming to the shape of the bore of the handle against which rests the spiral spring 26 tending to push the washer 22 outwardly. The operation of the device is obvious, the elliptical bore together with washer 22 and disk 25 holding the hook against turning in the handle.

Various other modifications of the invention may be resorted to without departing from the invention which is defined in the appended claims.

What we claim is:

1. In a landing net, the combination of a tubular handle, a net frame slidably mounted in the bore of said handle, said net frame comprising a collapsible hoop split to provide overlapping fingers, a shank block slidably mounted in said handle, means pivotally securing said fingers to said block at the ends thereof, and resilient means mounted on said block engaging the free ends of said fingers and tending to spread the latter.

2. In a landing net, the combination of a tubular handle, a net frame slidably mounted in the bore of said handle, said net frame comprising a collapsible hoop split to provide overlapping fingers, a shank block slidably mounted in said handle, means pivotally securing said fingers to said block at the ends thereof with the pivot points off the axial center of said fingers, and resilient means mounted on said block engaging the free ends of said fingers and tending to spread the latter.

3. In a landing net, the combination of a tubular handle, a net frame slidably mounted in the bore of said handle, said net frame comprising a collapsible hoop split to provide overlapping fingers, a shank block having a bore, a compression spring mounted in said bore, a washer mounted on the top of said compression spring and engaging the ends of said fingers, and means pivotally securing said fingers to said block adjacent the ends thereof.

4. In a landing net, the combination of a tubular handle, a net frame slidably mounted in the bore of said handle, said net frame comprising a collapsible hoop split to provide overlapping fingers, a shank block having a bore slidably mounted in said handle, a compression spring in said bore, a washer mounted on the top of said compression spring and engaging the ends of said fingers, and means pivotally securing said fingers to said block at the end thereof with the pivot point off the axial center of said fingers.

5. In a landing net, the combination of a tubular handle provided with a stop projecting from the wall of said bore at the open end of said handle, a net frame slidably mounted in the bore of said handle, said net frame comprising a collapsible hoop split to provide overlapping fingers, a shank block having an inclined upper edge with a pocket whereby the stop may engage said edge and position said block, means pivotally securing said fingers to said block adjacent the ends thereof, and resilient means mounted on said block engaging the free ends of said fingers and tending to spread the latter.

6. In a landing net, the combination of a tubular handle having stops projecting from the wall of said bore at the open end of said handle, a net frame slidably mounted in the bore of said handle, said net frame comprising a collapsible hoop split to provide overlapping fingers, a shank block having a bore slidably mounted in said handle, a compression spring in said bore, a washer mounted on the top of said compression spring and engaging the ends of said fingers, said shank block having ears on the upper edge with pockets between the ears whereby said stops may engage said edge and position said block, said fingers being pivotally secured between said ears with the pivot points off the axial centers of said fingers.

In witness that we claim the foregoing we have hereunto subscribed our names this 12th day of October, 1923.

SAMUEL H. HIGGINBOTHAM.
HENRY G. GODLEY.